United States Patent
Al-Harthi et al.

(10) Patent No.: US 8,541,520 B1
(45) Date of Patent: Sep. 24, 2013

(54) METHOD OF MAKING HIGH-DENSITY POLYETHYLENE WITH TITANIA-IRON NANOFILLERS

(71) Applicant: King Fahd University of Petroleum and Minerals, Dhahran (SA)

(72) Inventors: Mamdouh Ahmad Al-Harthi, Dhahran (SA); Omer Yahya Bakather, Dhahran (SA); Sadhan Kumar De, Dhahran (SA); Reyad Awwad Khalaf Shawabkeh, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/746,258

(22) Filed: Jan. 21, 2013

(51) Int. Cl.
- C08F 4/18 (2006.01)
- C08F 2/06 (2006.01)
- C08F 110/02 (2006.01)
- C08F 4/685 (2006.01)

(52) U.S. Cl.
USPC ........... 526/107; 526/73; 526/88; 526/96; 526/101; 526/113; 526/193; 526/352

(58) Field of Classification Search
USPC ............ 526/107, 73, 88, 96, 101, 113, 193, 526/352
See application file for complete search history.

(56) References Cited

U.S. PATENT DOCUMENTS

| | | |
|---|---|---|
| 2002/0068795 A1 | 6/2002 | Won et al. |
| 2008/0213572 A1 | 9/2008 | Halahmi et al. |
| 2008/0286593 A1 | 11/2008 | Boyer et al. |
| 2011/0162955 A1 | 7/2011 | Butzloff et al. |

FOREIGN PATENT DOCUMENTS

| | | |
|---|---|---|
| CN | 101537682 A | 9/2009 |
| EP | 1 674 513 A1 | 6/2006 |
| JP | 2002-179931 | 6/2002 |

OTHER PUBLICATIONS

Wu et al. "Synthesis, Structural Characterization, and Ethylene Polymerization Behavior of the Vanadium(III) Complexes Bearing Salicylaldiminato Ligands". Organometallics, 2008. 27(15): p. 3840-3848.*

Wu et al. "Ethylene Polymerization and Ethylene/Hexene Copolymerization with Vanadium (III) Catalysts Bearing Heteroatom-Containing Salicylaldiminato Ligands", Journal of Polymer Science: Part A: Polymer Chemistry (2009), vol. 47, pp. 3573-3582.*

Wu, J.-Q., et al., "Synthesis, Structural Characterization, and Ethylene Polymerization Behavior of the Vanadium(III) Complexes Bearing Salicylaldiminato Ligands". Organometallics, 2008. 27(15): p. 3890-3848.

(Continued)

Primary Examiner — Kelechi Egwim
(74) Attorney, Agent, or Firm — Richard C. Litman

(57) ABSTRACT

The method of making high-density polyethylene with titania-iron nanofillers involves mixing a $TiO_2$/Fe titania-iron nanofiller with a vanadium (III) complex bearing salicylaldiminato ligands polymerization catalyst in a reactor. The reactor is then charged with toluene and heated to a temperature of about 30° C. Following heating, ethylene is fed into the reactor at a fixed pressure, and a methyl aluminum dichloride cocatalyst is added to initiate in situ polymerization. Polymerization is quenched to yield high-density polyethylene with titania-iron nanofillers, which is then washed and dried. Through the addition of a $TiO_2$/Fe nanofiller, the molecular weight, the crystallinity and the melting temperature of high-density polyethylene are all increased, while the polydispersity index (PDI) is decreased.

15 Claims, 4 Drawing Sheets

(56) References Cited

OTHER PUBLICATIONS

Wu, Ji-Qian et al., "Ethylene Polymerization and Ethylene/Hexene Copolymerization with Vanadium (III) Catalysts Bearing Heteroatom-Containing Salicylaldiminato Ligands", Journal of Polymer Science: Part A: Polymer Chemistry (2009), vol. 47, pp. 3573-3582.

* cited by examiner

METHOD OF MAKING HIGH-DENSITY POLYETHYLENE WITH TITANIA-IRON NANOFILLERS

BACKGROUND OF THE INVENTION

1. Field of the Invention

The present invention relates to polyolefin nanocomposites, and particularly to a method of making high-density polyethylene (HDPE) with titania-iron nanofillers in order to control the molecular weight of the HDPE.

2. Description of the Related Art

Ethylene polymerization is a well-known process, and is conventionally performed using free-radical polymerization, the Zeigler-Natta catalyst technique, the Phillips catalyst technique, the metallocene catalyst technique, and the post-metallocene catalyst technique. Polyolefin nanocomposites are of great interest due to their mechanical and thermal properties. It has been found that addition of nanoparticles, such as titanium dioxide, doped titanium, silicon dioxide, aluminum trioxide and zirconium dioxide, may improve the polymer properties of such composites.

$TiO_2$-filled polymers have been prepared by solution mixing, melt compounding and in situ polymerization. In situ polymerization is considered to be the most promising method, as it provides a homogeneous dispersion of the filler in the polymer matrix. Although $TiO_2$-filled polymers are known, the properties of such composite materials are fixed. It would be desirable to provide a method for doping the titania nanofiller material that permits control over and variation of the overall polymeric properties, such as molecular weight and the associated thermal properties.

Thus, a method of making high-density polyethylene with titania-iron nanofillers solving the aforementioned problems is desired.

SUMMARY OF THE INVENTION

The method of making high-density polyethylene (HDPE) with titania-iron nanofillers permits control over and variation of the overall polymeric properties, such as molecular weight and the associated thermal properties. Through the addition of a $TiO_2$/Fe nanofiller, the molecular weight, the crystallinity and the melting temperature of high-density polyethylene are all increased, while the polydispersity index (PDI) is decreased. In order to make the HDPE nanocomposite, a $TiO_2$/Fe titania-iron nanofiller is first mixed with a polymerization catalyst (a vanadium (III) complex bearing bidentate salicylaldiminato ligands) in a reactor. The reactor is then charged with solvent (e.g., toluene) and heated to a temperature suitable for polymerization, e.g., about 30° C. Following heating, the monomer (ethylene) is fed into the reactor at a fixed pressure, and a methyl aluminum dichloride cocatalyst (MADC) is added to initiate polymerization. Polymerization is quenched to yield high-density polyethylene with titania-iron nanofillers, which is then washed and dried.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 4:
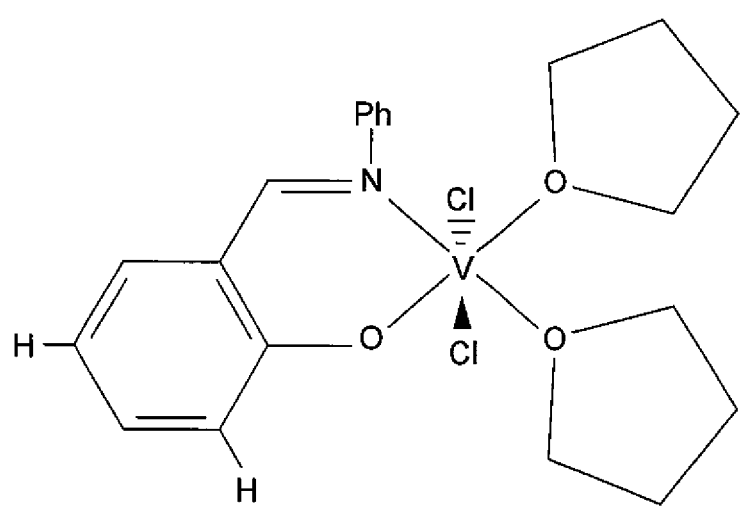
FIG. 4 shows the structural formula of the catalyst composed of vanadium (III) complex with bidentate salicylaldiminato ligands used in the method of making high-density polyethylene with titania-iron nanofillers according to the present invention.

The method of making high-density polyethylene (HDPE) with titania-iron nanofillers permits control over and variation of the overall polymeric properties, such as molecular weight and the associated thermal properties. As will be shown below, through the addition of a $TiO_2$/Fe nanofiller, the molecular weight, the crystallinity and the melting temperature of high-density polyethylene are all increased, while the polydispersity index (PDI) is decreased. In order to make the high-density polyethylene with titania-iron nanofillers, a polymerization catalyst is first prepared. The catalyst is a vanadium (III) complex bearing salicylaldiminato ligands of the general class $[RN=CH(ArO)]VCl_2(THF)_2$ where Ar is $C_6H_4$ and R=Ph, and more particularly, having the formula shown in FIG. 4. The catalyst was synthesized by conventional methods, such as that taught in Wu, J.-Q., et al., "Synthesis, Structural Characterization, and Ethylene Polymerization Behavior of the Vanadium(III) Complexes Bearing Salicylaldiminato Ligands", Organometallics, 2008, 27(15): p. 3840-3848 (in particular, the catalyst is designated catalyst 2a in the Wu article, shown in Scheme 1 at p. 3841), which is hereby incorporated by reference in its entirety. In this procedure, $VCl_3(THF)_3$ (0.75 g) was dissolved in dried tetrahydrofuran (20 mL) and added slowly to a solution of 2-(PhNCH)$C_6H_4$OH (0.40 g) in tetrahydrofuran (20 mL) to form a red mixture. This mixture was stirred for 10 min, after which $Et_3N$ (0.3 mL, 216 mg) was added and stirred for 4 hours at room temperature. Finally, the solution was concentrated to about 10 mL, and then the mixture was filtered to remove $NH_4Cl$. Red-black crystals formed by diffusion of n-hexane (20 mL) into the solution, thus producing the vanadium (III) complex bearing salicylaldiminato ligands shown in FIG. 4 that is used as the polymerization catalyst.

As a control, undoped titania nanofillers were synthesized, in addition to nanofillers formed from titania doped with iron. The undoped titania nanofillers were synthesized by a modified sol-gel process under constant sonication. About 500 µl of titanium (IV) alkoxide precursor in 15 mL of ethanol was hydrolyzed in the presence of 1 mL of water at room temperature to form a white solution of hydrolyzed titania particles. For the iron-doped titania nanofillers, 5 mL of an ethanolic solution of an inorganic precursor $Fe(NO_3)_3 \cdot 9H_2O$ (1% solution) was added to the hydrolyzed titania solution under constant sonication. The reaction mixture was sonicated for 30 minutes. Following sonication, the precipitate was washed with ethanol multiple times to remove excess $NO_3^-$ and $Fe^{3+}$. The precipitate was dried overnight at 100° C., and then heated for 5 hours to convert the amorphous titania into the crystalline anatase form. Finally, the product was ground into a fine powder having a particle size less than 10 nm.

Ethylene polymerizations were carried out in a 250 mL round-bottom flask equipped with a magnetic stirrer. A 1.8 mg portion of the catalyst (prepared in advance, as described above) and an amount of the $TiO_2$/Fe nanofiller were added to the flask, and the reactor was charged with toluene (80 mL). As will be described below, for purposes of experimental testing, the amount of the $TiO_2$/Fe nanofiller was varied between 5, 10 and 15 mg. A sample with no nanofiller was also prepared as a control.

The flask was then immersed in an oil bath, and when the reactor temperature was equilibrated with the bath oil temperature (30° C.), nitrogen gas was removed using a pump vacuum. Following nitrogen removal, ethylene was fed into the reactor with a fixed input pressure of 1.3 bar. After 10 minutes of saturation of ethylene in toluene, 1 mL of a methyl aluminum dichloride (MADC) co-catalyst was introduced into the reactor to initiate in situ polymerization. The polymerization reaction was quenched by adding 250 mL of methanol containing HCl (5 vol %). Finally, the polymer was washed with an excess amount of methanol and dried in an oven at 50° C. for 24 hours.

Table 1 below summarizes the average molecular weight (Mw), the polydispersity index (PDI), the melting temperature ($T_m$), and the percent of crystallinity of high-density polyethylene (HDPE) samples prepared as described above with the $TiO_2$/Fe nanofiller varied between 5, 10 and 15 mg, along with a control sample of high-density polyethylene having no nanofiller. As can be seen in Table 1 below, 5 mg. of the $TiO_2$/Fe nanofiller results in maxima in weight average molecular weight, crystallinity, and melting temperature of the high-density polyethylene, and a minimum in the polydispersity index.

TABLE 1

HDPE Properties as a Function of Nanofiller Content

| $TiO_2$/Fe (mg) | Mw (Daltons) | PDI | $T_m$ (° C.) | % of Crystallinity |
| --- | --- | --- | --- | --- |
| 0 | 196,208 | 3.676 | 136.42 | 49.71 |
| 5 | 555,072 | 2.427 | 137.22 | 53.86 |
| 10 | 461,622 | 3.035 | 136.87 | 57.79 |
| 15 | 391,139 | 2.811 | 136.82 | 59.25 |

Figure 1:
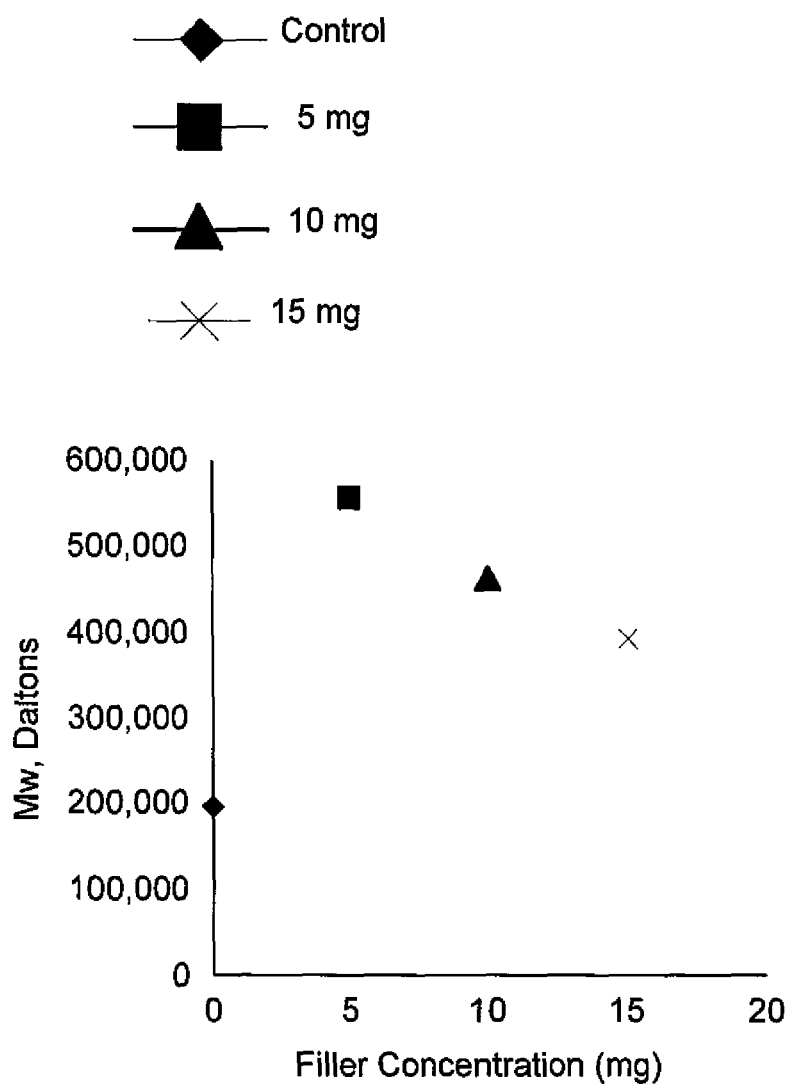
FIG. 1 is a plot illustrating variation in the weight average molecular weight of high-density polyethylene samples having varying amounts of a titania-iron nanofiller, the samples being prepared according to the method of making high-density polyethylene with titania-iron nanofillers according to the present invention, using a polymerization time of 10 minutes at a temperature of 30° C.
Figure 2:
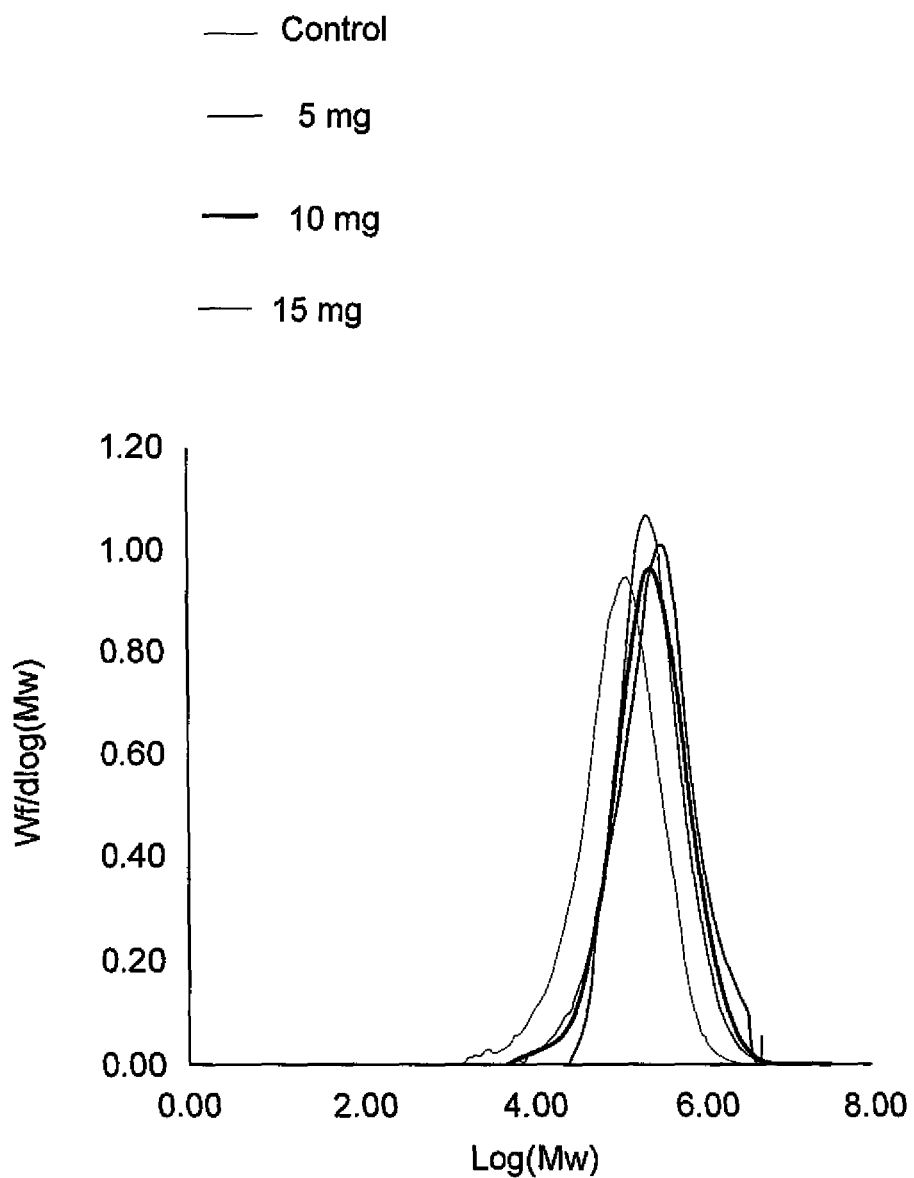
FIG. 2 is a graph illustrating the molecular weight distribution of the high-density polyethylene samples of FIG. 1 as shown by gel permeation chromatography.

As can be seen above in Table 1, the weight average molecular weight (Mw) was found to increase with the addition of the $TiO_2$/Fe nano filler using the vanadium complex catalyst. (The "weight average molecular weight" of a polymer is calculated as $M_w=(\Sigma_i N_i M_i^2)/(\Sigma_i N_i M_i)$, where $N_i$ is the number of molecules of molecular weight $M_i$. This should be contrasted with the "number average molecular weight, which is calculated as $M_n=(\Sigma_i N_i M_i)/(\Sigma_i N_i)$. The number average molecular weight can be measured by gel permeation chromatography. The ratio of the weight average to the number average is the polydispersity index.) The optimum value for the nanofiller was 5 mg, yielding a molecular weight of 555,072 Daltons. An increase in the nanofiller concentration to 10 mg and 15 mg resulted in a decrease in the weight average molecular weight when compared to the 5 mg of nanofiller concentration, but still showed a significant increase compared to the control. FIG. 1 illustrates variation in the weight average molecular weight of the polyethylene nanocomposites of Table 1, using a polymerization time of 10 minutes at a temperature of 30° C. FIG. 2 illustrates the molecular weight distribution of the polyethylene nanocomposites using gel permeation chromatography.

The thermal characteristics of the polyethylene nanocomposites were determined by differential scanning calorimetry (DSC). The melting temperatures of HDPE and the polyethylene nanocomposite samples were determined by DSC from the second heating cycle. The polyethylene nanocomposites were found to have melting temperatures ($T_m$) slightly higher than that of the control sample (as shown above in Table 1), due to the increase in the molecular weight of the polyethylene nanocomposites.

The percentage of crystallinity in the polyethylene nanocomposite samples was found to increase when the amount of the filler increased, as shown in Table 1, where the highest percent of crystallinity was obtained using 15 mg of the $TiO_2$/Fe filler, yielding a crystallinity of 59.25%, compared to the control sample's crystallinity of 49.71%. The above results confirm that that nanotitanium oxide doped with 1% iron to form the nanofiller acts as a molecular weight controller in the ethylene polymerization using a catalyst formed from a vanadium (III) complex bearing salicylaldiminato ligands.

Figure 3:
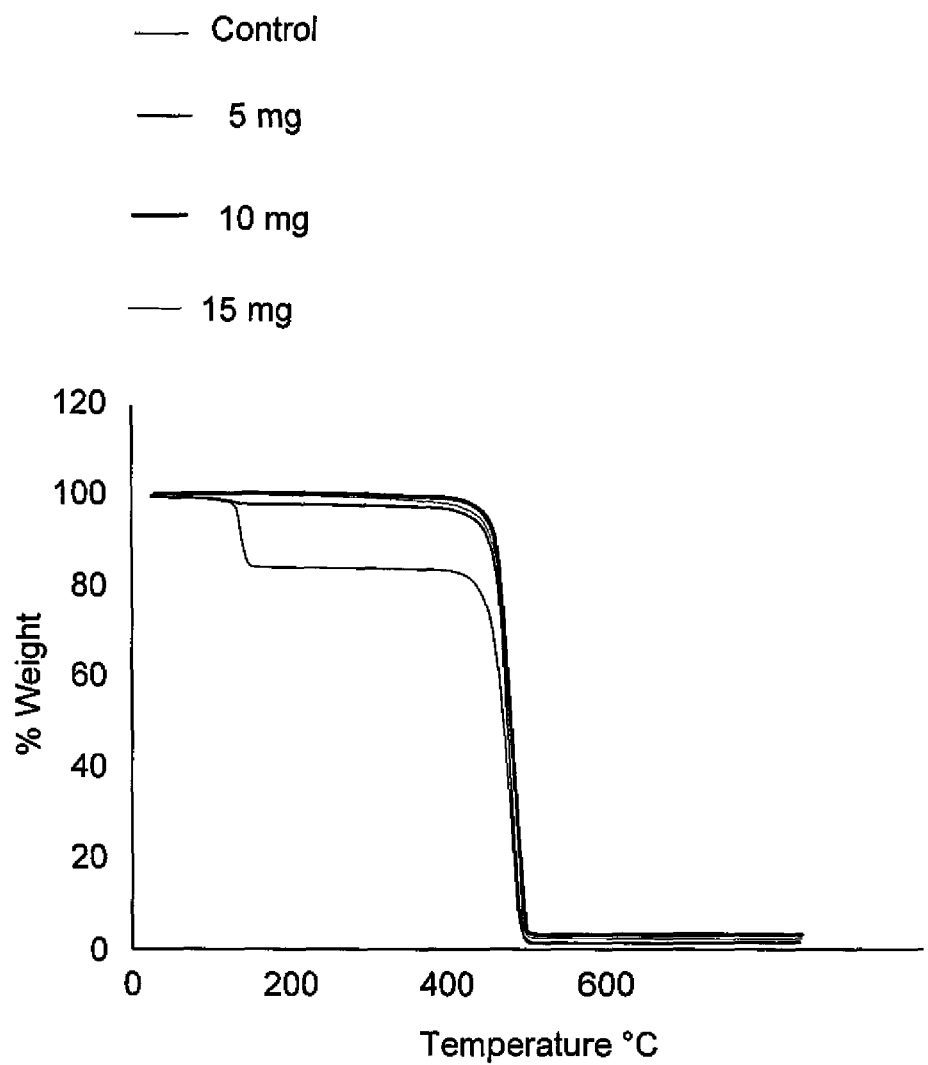
FIG. 3 is a graph illustrating melting temperature of the high-density polyethylene samples of FIG. 1 as shown by differential scanning calorimetry.

Melting temperature of the polyethylene nanocomposites was found to increase when the $TiO_2$/Fe nanofiller was added to the polymerization reaction, as shown in FIG. 3. The increase in melting temperature is attributed to the higher molecular weight and the content of the nanofiller.

It is to be understood that the present invention is not limited to the embodiments described above, but encompasses any and all embodiments within the scope of the following claims.

We claim:

1. A method of making high-density polyethylene with increased molecular weight with titania-iron nanofiller, comprising the steps of:
    mixing nanoparticles of an iron-doped titanium dioxide filler with a polymerization catalyst in an organic solvent in a reactor to form a reaction mixture;
    heating the reactor for a period of time sufficient to bring the reaction mixture to a polymerization reaction temperature;
    feeding ethylene monomer into the reactor;
    adding methyl aluminum dichloride as a co-catalyst to the reactor to initiate in situ polymerization; and
    quenching the polymerization.

2. The method of making high-density polyethylene with increased molecular weight as recited in claim 1, wherein the polymerization catalyst is a vanadium (III) complex with salicylaldiminato ligands having the formula:

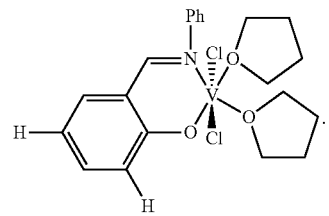

3. The method of making high-density polyethylene with increased molecular weight as recited in claim 1, wherein the polymerization reaction temperature is about 30° C.

4. The method of making high-density polyethylene with increased molecular weight as recited in claim 1, wherein the step of quenching the polymerization comprises adding methanol containing 5% hydrochloric acid by volume to the reactor.

5. The method of making high-density polyethylene with increased molecular weight as recited in claim 1, wherein the nanoparticles of iron-doped titanium dioxide have a particle size less than 10 nm.

6. The method of making high-density polyethylene with increased molecular weight as recited in claim 1, further comprising the step of removing nitrogen from the reactor prior to the step of feeding ethylene monomer into the reactor.

7. The method of making high-density polyethylene with increased molecular weight as recited in claim 1, wherein said step of feeding ethylene monomer into the reactor comprises feeding ethylene monomer into the reactor at a pressure of about 1.3 bar.

8. The method of making high-density polyethylene with increased molecular weight as recited in claim 1, wherein said organic solvent comprises toluene.

9. The method of making high-density polyethylene with increased molecular weight as recited in claim 1, wherein said step of feeding ethylene monomer into the reactor comprises saturating the solvent with ethylene monomer.

10. High-density polyethylene with increased molecular weight made according to the method of claim 1.

11. The method of making high-density polyethylene with increased molecular weight as recited in claim 1, further comprising the steps of:
   hydrolyzing titanium (IV) alkoxide precursor in ethanol solvent in the presence of about 1 mL of water at room temperature to form a solution of hydrolyzed titania particles;
   adding an ethanolic solution of Fe(NO$_3$)$_3$.9H$_2$O precursor to the solution of hydrolyzed titania particles to form a mixture;
   sonicating the mixture to form a precipitate;
   washing the precipitate in ethanol;
   drying the precipitate; and
   heating the precipitate to convert amorphous titania into crystalline anatase titania;
   grinding the precipitate to form the nanoparticles of the iron-doped titanium dioxide filler.

12. The method of making high-density polyethylene with increased molecular weight as recited in claim 1, wherein iron forms about 1% by weight of said nanoparticle filler.

13. A method of making high-density polyethylene with increased molecular weight with titania-iron nanofiller, comprising the steps of:
   mixing nanoparticles of an iron-doped titanium dioxide filler with a polymerization catalyst in an organic solvent in a reactor to form a reaction mixture, the polymerization catalyst being a vanadium (III) complex with salicylaldiminato ligands having the formula:

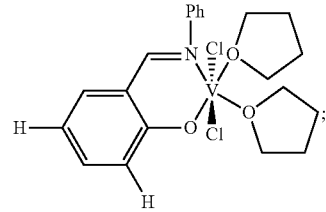

heating the reactor for a period of time sufficient to bring the reaction mixture to a polymerization reaction temperature;
   feeding ethylene monomer into the reactor;
   adding methyl aluminum dichloride as a co-catalyst to the reactor to initiate in situ polymerization; and
   quenching the polymerization.

14. The method of making high-density polyethylene with increased molecular weight as recited in claim 13, wherein iron forms about 1% by weight of said nanoparticle filler.

15. High-density polyethylene with increased molecular weight made according to the method of claim 13.

* * * * *